United States Patent [19]

Pratt

[11] Patent Number: 4,782,711
[45] Date of Patent: Nov. 8, 1988

[54] METHOD AND APPARATUS FOR MEASURING MASS FLOW

[75] Inventor: Wayne Pratt, Scottsdale, Ariz.

[73] Assignee: K-Flow Division of Kane Steel Co., Inc., Millville, N.J.

[21] Appl. No.: 918,404

[22] Filed: Oct. 14, 1986

[51] Int. Cl.$^4$ .............................................. G01F 1/84
[52] U.S. Cl. ................................. 73/861.38; 364/510
[58] Field of Search ...................... 73/861.37, 861.38; 364/510

[56] References Cited

U.S. PATENT DOCUMENTS

| | | | |
|---|---|---|---|
| 3,087,325 | 4/1963 | Roth | 73/861.38 X |
| 3,355,944 | 12/1967 | Sipin | 73/861.38 |
| 4,187,721 | 2/1980 | Smith | 73/861.38 |
| 4,628,744 | 12/1986 | Lew | 73/861.38 |
| 4,635,485 | 1/1987 | Lew | 73/861.37 |
| 4,653,332 | 3/1987 | Simonsen | 73/861.38 |
| 4,655,089 | 4/1987 | Kappelt et al. | 73/861.38 |
| 4,658,657 | 4/1987 | Kuppers | 73/861.38 |
| 4,660,421 | 4/1987 | Dahlin et al. | 73/861.38 |
| 4,680,974 | 7/1987 | Simonsen et al. | 73/861.38 |
| 4,689,989 | 9/1987 | Aslesen et al. | 73/61.1 R |
| 4,691,578 | 9/1987 | Herzl | 73/861.38 |
| 4,703,660 | 11/1987 | Brenneman | 73/861.38 |

FOREIGN PATENT DOCUMENTS

| | | |
|---|---|---|
| WO86/00699 | 1/1986 | PCT Int'l Appl. . |
| 146982 | 3/1961 | U.S.S.R. . |
| 149900 | 11/1961 | U.S.S.R. . |
| 2171200A | 8/1986 | United Kingdom . |

OTHER PUBLICATIONS

*Soviet Inventions Illustrated*, No. SU-732-672, printed and published by Derwent Publications Ltd. (Feb. 1981).
Danfoss Co., "MASSFLO".
Exac Corp., Digital Precision Mass Flow Meter.
Smith Meter Co., "S-MASS", 1985, Brochures A, B, and C.
Micro Motion, Model D25.
Instrument Engineers Handbook (Rev. Ed.), Mass Flow Meters (pp. 87-90), 1982.
Micro Motion, Remote Electronics Instruction Manual & Supplement.
Krohne–"CORIMASS" Mass Flow Meter Brochure.
Rheonik–"SERICO RHM" Mass Flow Meter Brochure.
E & H Flowtec–"M POINT" Flow Meter Brochure.

*Primary Examiner*—Herbert Goldstein
*Attorney, Agent, or Firm*—Seidel, Gonda, Goldhammer & Abbott

[57] ABSTRACT

A method and apparatus for determining mass flow of fluid flowing within a conduit. The conduit is oscillated periodically transverse to the flow therein, and sensors sense the movement of the conduit at discrete, spaced locations on the conduit. The sensors generate periodic signals representative of the movement of the conduit at said locations. The method of the present invention comprises the steps of determining the instantaneous amplitude difference between the signals at a plurality of discrete adjacent intervals (which may or may not be of equal width), determining the product of the absolute value of the instantaneous amplitude difference and the amplitude of the interval for each said interval, determining the sum of said products for each interval over a cycle of oscillation, and generating from the sum a signal representative of mass flow.

An apparatus according to the invention comprises circuitry for determining the instantaneous amplitude difference between the signals from the sensors of the flow meter at a plurality of discrete, adjacent intervals, circuitry for determining the product of the absolute value of the instantaneous amplitude difference and the width of the interval for each said interval, circuitry for determining the sum of the products for each interval over a cycle of oscillation, and circuitry for generating from the sum a signal representative of the mass flow. The circuitry may comprise discrete circuitry or may be subsumed within a microprocessor.

21 Claims, 5 Drawing Sheets

METHOD AND APPARATUS FOR MEASURING MASS FLOW

FIELD OF THE INVENTION

This invention relates to a method and apparatus for measuring the mass flow rate of fluent material flowing through a conduit by determining the Coriolis reaction of the flow in response to an applied oscillation of the conduit. The flow within a flow conduit or tube, which is oscillated transverse to the flow, will react with an oppositely directed Coriolis force on opposite sides of the applied oscillation of the flow tube.

This invention relates particularly to the determination of an amount of work applied to a resilient flow tube structure by means of the distributed Coriolis reaction acting over each oscillation cycle. The work performed by the Coriolis reaction is proportional to the mass flow within the flow tube.

BACKGROUND OF THE INVENTION

It is known to utilize the Coriolis reaction of a fluid on a flow tube in order to determine the mass flow through the flow tube. Original developments in this area utilized gyroscopic principles and included a continuous flow tube loop rotated about one axis so as to produce a constant Coriolis force coupled about a separate axis of the flow tube loop. The Coriolis reaction in this type of apparatus is measured by a number of various sensing structures. Pearson U.S. Pat. No. 2,624,198 includes a rotating wheel having a suitable moment of inertia and positioned on the rotating flow tube in such a fashion that the wheel rotates with a force in an opposite direction to the Coriolis force so as to maintain the flow tube in equilibrium. The detecting means which controls the rotation of the wheel continuously corrects the momentum of the wheel so as to correspond to the gyroscopic force of the flow meter. The gyroscopic force varies with respect to the mass flow within the flow tube.

Altfillisch, et al., U.S. Pat. No. 2,813,423 utilizes a rotating flow tube having strain gauges which measure the force of the torque produced by the oppositely directed Coriolis reaction as a function of mass flow.

Roth U.S. Pat. No. 2,865,201, teaches the use of a rigid circular flow tube oscillated about an axis within the plane of the flow tube so as to produce an alternating Coriolis reaction in response to the oscillatory motion. The flow tube in this patent and subsequent related patents utilize circular flow tubes which attempt to simulate the gyroscopic movement of the fluid similar to that found in the previously known rotating flow tube structures. U.S. Pat. No. 3,087,325 utilizes magnetic type sensors which produce a continuously varying signal with respect to the motion of the flow tube and which are compared to the signal of a synchronous detector as a means of calculating the mass flow as a function of the output of the sensors.

Patents to Sipin, U.S. Pat. Nos. 3,355,944 and 3,485,098, teach a projecting U-shaped flow tube which directs the flow through continuous tubing having a partial curvature or a deflection from the axis line formed by the input and output of the flow tube. The flow tube is oscillated transverse to the flow at the point of maximum flow tube deflection with sensors being positioned on opposite side of the substantially U-shaped structure and measure the movement of the flow tube in response to the opposite side Coriolis reaction. Additionally, magnetic vibration velocity sensors are utilized to sense the flow tube motion to determine the mass flow. The additive output of the two sensors is proportional to the amplitude of vibration of the applied oscillation, and the differential output is proportional to the rotational motion of the flow tube due to the Coriolis reaction force.

Cox U.S. Pat. No. 4,127,028 and Smith U.S. Pat. No. 4,187,721 (now reissue patent U.S. Pat. No. Re. 31,450) show optical switches mounted on opposing legs of a fixedly mounted and cantilevered U-shaped flow tubes. The optical switches produce signals in response to the applied oscillation with the time difference between the signals being proportional to the mass flow through the flow tube. The '028 patent utilizes two parallel and adjacently mounted cantilevered flow tubes creating a tuning fork effect with the sensors being mounted on adjacent portions of the two flow tubes to measure the Coriolis reaction with respect to one another at these positions. Flow is provided through each flow tube in the same relative direction and the flow tubes are oscillated in opposite modes. The Coriolis reaction as seen by the sensors on the adjacent flow tubes is substantially doubled, therefore increasing the sensitivity of the mass flow meter.

U.S. Pat. No. 4,422,338 to Smith shows continuously varying analog type sensors similar to the magnetic sensors shown in the Roth and Sipin patents (referred to above), which are mounted on opposite legs of a cantilevered U-shaped flow tube. The mass flow rate is determined as a function of the time separation of the sensor signals with respect to the passage of the flow tube through a plane substantially at the midpoint of the oscillation.

SUMMARY OF THE INVENTION

The present invention relates to a method and circuitry for determing the mass flow rate of a fluid flowing within a flow tube or conduit. The flow tube is subjected to a periodic oscillation to produce a Coriolis reaction force by the flow which is distributed along the flow tube length in such a manner to produce transverse velocity which is in phase on opposite sides of the applied oscillation but which differs in direction on these opposite sides. The work performed by the Coriolis reaction force on the vibrating flow tube is proportional to the mass flow within the flow tube.

The method and apparatus of the present invention rely on the fact that the distributed Coriolis force acting over each oscillation cycle inputs energy to the resilient flow tube which over time is proportional to the integrated force and the resultant deformation of the flow tube. The deformation of the flow tube is periodic, according to the oscillation pattern and the mass flow rate, and will produce an oppositely directed reaction on opposite sides of the applied oscillation which is sensed by sensors located at, typically, symmetrical positions on the flow tube. The total difference between the outputs of the two sensors over a cycle can be thought of as the total or integrated work input per cycle which is added to the deflection of the oscillating flow tube by the effect of the distributed Coriolis reaction force over an oscillation cycle. The calculation of the total energy input, or work performed, is proportional to the Coriolis reaction and the mass flow within the flow tube structure.

The determination of the work input to the flow tube with the Coriolis mass flow meter may be made by digitizing the output of the continuously variable sensor signals, utilizing analog signal sensors or mixing a combination of the analog and digitized signals which are then summed or integrated to yield total energy input per cycle.

A preferred method according to the present invention is applied to a conduit oscillating periodically transverse to the flow therein and having sensors for sensing the movement of the conduit at discrete, spaced locations on the conduit. The sensors generate periodic signals representative of the movement of the conduit at said locations. The preferred method comprises the steps of determining the instantaneous amplitude difference between the signals at a plurality of discrete adjacent intervals (which may or may not be equal), determining the product of the absolute value of the instantaneous amplitude difference and the amplitude of the interval for each said interval, determining the sum of said products for each interval over a cycle of oscillation, and generating from the sum a signal representative of mass flow.

A method according to the present invention as applied to a Coriolis type mass flow meter also contemplates the steps of causing the conduit to oscillate periodically, sensing the movement of the conduit at at least two discrete, spaced locations on the conduit, generating periodic signals representative of the movement of the conduit at said locations, determining the integral of the absolute value of the difference between the amplitudes of the signals over a cycle of oscillation, and generating from the integral a signal representative of mass flow.

An apparatus according to the invention comprises means for determining the instantaneous amplitude difference between the signals from the sensors of the flow meter at a plurality of discrete, adjacent intervals, means for determining the product of the absolute value of the instantaneous amplitude difference and the amplitude of the interval for each said interval, means for determining the sum of the products for each interval over a cycle of oscillation, and means for generating from the sum a signal representative of the mass flow. The means for performing the various operations on the signal may comprise discrete circuit means, or may be subsumed within a microprocessor.

Apparatus according to the invention also may include means for causing the conduit to oscillate periodically, means for sensing the movement of the conduit at at least two discrete, spaced locations on the conduit and generating periodic signals representative of the movement at said locations, means for obtaining the integral of the absolute value of the difference between the amplitudes of the signal from the flow meter sensor for a differential interval over a cycle of oscillation and means for generating from the integral a signal representative of the mass flow.

DESCRIPTION OF THE DRAWINGS

For the purpose of illustrating the invention, there is shown in the drawings a form which is presently preferred; it being understood, however, that this invention is not limited to, the precise arrangements and instrumentalities shown.

DESCRIPTION OF THE INVENTION

Figure 1:
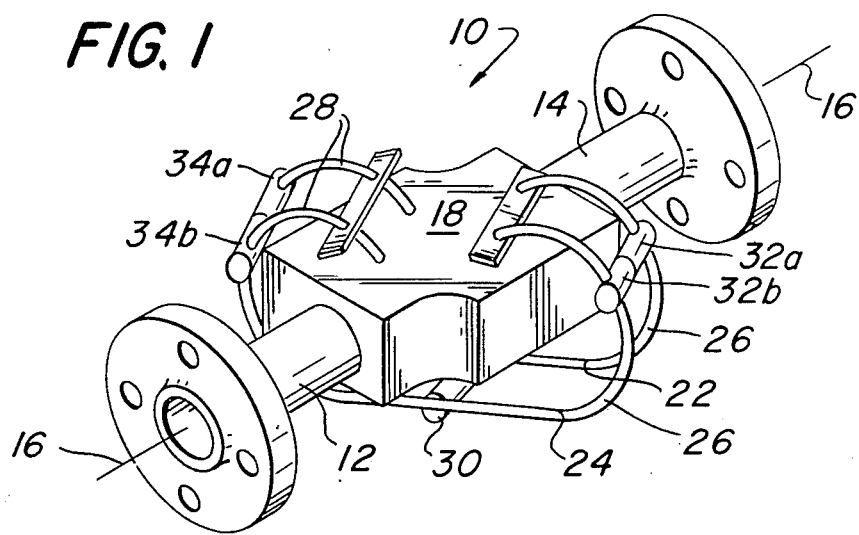
FIG. 1 is a simplified illustration of a mass flow meter for use with the method and apparatus of the present invention.

Referring now to the drawings, wherein like numerals indicate like elements, there is shown in FIG. 1 a dual tube mass flow meter conduit 10 of a type, preferably, contemplated for use with the present invention. The flow meter conduit 10 in FIG. 1 is constructed according to the teachings of co-pending patent application No. 809,658, now U.S. Pat. No. 4,716,771 issued Jan. 5, 1988 filed September 26, 1986 and titled "Mass Flow Measuring Device." The disclosure of this co-pending application is herein incorporated by reference. However, a flow meter conduit for use with the present invention may take any form as desired.

Flow meter conduit 10, as shown in FIG. 1, comprises an inlet 12 and an outlet 14 which connect the flow meter conduit 10 to a fluid pipeline or other defined fluid stream (not shown). The inlet 12 and outlet 14 as shown lie substantially along a straight axis line 16. Flow meter conduit 10 generally includes two flow tubes 22 and 24 which are positioned adjacent and parallel substantially through their entire length. The inlet 12 generally directs the flow into a housing 18 which splits the incoming flow from the defined fluid stream into two equal portions and directs it into the two flow tubes 22 and 24. The flow is converged after exhausting from the flow tubes 22 and 24 into housing 18, and is directed into the outlet 14 and returned to the fluid stream. In the embodiment shown in FIG. 1, the flow tubes 22 and 24 emerge from the inlet 12 to form a first loop 26, pass closely adjacent housing 18 and axis line 16 and form a second loop 28 which terminates at the housing 18 proximal to their entrance ends on housing 18.

Oscillatory motion of the flow tubes 22 and 24 is imparted by driver 30 which is preferably positioned at the symmetrical center of flow tubes 22 and 24 and drives the flow tubes 22 and 24 in opposing directions transverse to the flow therein.

Sensors 32 and 34 are provided on each of the loops 26 and 28 respectively. Sensors 32 on loop 26 of the two flow tubes 22 and 24 are indicated by the numerals 32a and 32b, while the sensors 34 on loop 28 are indicated by the numerals 34a and 34b. Sensors portions "a" and "b" are positioned adjacent to one another such that the movement of the flow tubes 22 and 24 with respect to one another may be measured.

Sensors 32 and 34 may be of any suitable type, such as displacement sensors, velocity sensors or acceleration sensors. Suitable sensors are disclosed in co-pending patent application No. 926,493, filed, Nov. 4, 1986, and titled "Method Of Sensing And Structure For Determining Mass Flow". The disclosure of this co-pending application is hereby incorporated by reference. For purposes of illustrating the invention, the use of velocity sensors will be assumed, it being understood that those of ordinary skill in the art will understand that the invention is not limited to velocity sensors, but includes displacement and acceleration sensors as well.

It is known that when a closed conduit, such as flow tube 22 or 24, is driven by a transverse periodic oscillation, Coriolis reaction forces will be produced by the fluid moving within the conduit. The Coriolis force will be distributed along the flow tube length in such a manner as to produce velocities which vary in time according to the driving oscillation and vary in phase according to the mass flow of fluid through the flow tube.

This distributed Coriolis force, acting over each oscillation cycle, inputs an amount of work to the flow tube proportional to the integrated, or total, force and integrated, or total, deformation imparted to the flow tube structure by the driving force. The deformation of the flow tube being periodic, mass flow will produce a continuous difference between two velocity sensors 32, 34, located at discrete, spaced locations on the flow tube. It is assumed that velocity sensors 32 and 34 are of the coil/moving magnet type, although any suitable sensor ay readily be substituted by those skilled in the art. The total difference in the signals produced by the velocity sensors over a cycle, being the result of an integrated force and distance, can be thought of as the energy input per cycle to the flow tubes 22, 24 from the distributed Coriolis force. Mass flow is directly proportional to the total energy input per cycle from the distributed Coriolis force.

Figure 2:
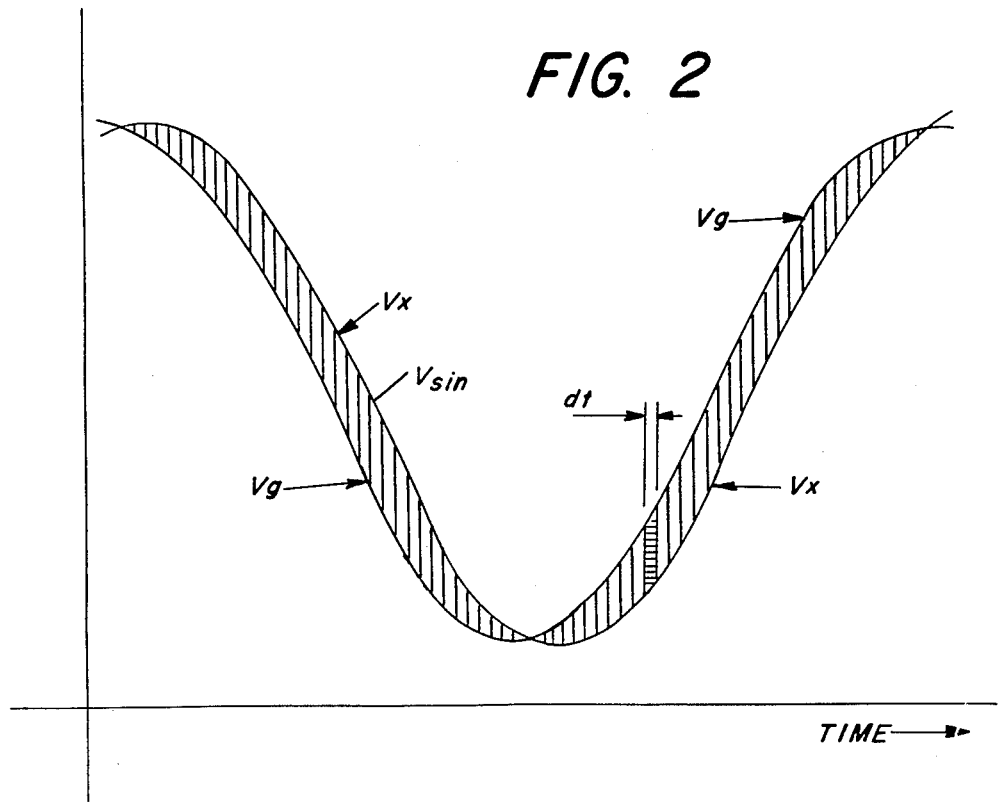
FIG. 2 is a simplified illustration of the waveforms generated by the sensors associated with the mass flow meter shown in FIG. 1.

As already noted, velocity sensors 32 and 34 generate output signals representative of relative velocity of flow tubes 22, 24 at the points at which the velocity sensors are located. FIG. 2 illustrates the output signals of two velocity sensors, arbitrarily positioned on the loops 26, 28 of the adjacent flow tubes 22, 24. The signals from each sensor will be referred to herein as $V_x$ and $V_y$. FIG. 2 illustrates the velocity signals $V_x$ and $V_y$ for one oscillation cycle for an arbitrarily-chosen mass flow rate. The vertical lines designated $V_{sin}$ in FIG. 2 represent the instantaneous amplitude difference in the velocity signals from each sensor, i.e., $V_x-V_y$, at different points in time. Adjacent pairs of vertical lines also define an interval dt. As shown in FIG. 2, an oscillation cycle may be divided into a number of intervals dt which may or may not be equal.

The area of each interval between the curves for $V_x$ and $V_y$ represents an amount of energy input to the conduit during that interval. The total area for all intervals, and hence the total area between the two curves $V_x$ and $V_y$, thus represents the total energy input to the flow tube by the Coriolis force over the course of a complete cycle. The area for a single cycle can be determined from the following formulas:

$$\text{Area } A = \int |V_x - V_y| dt \quad (1a)$$

or, since dt will be a constant representing the sampling interval, the area can be expressed as $$\text{Area } A' = \int |V_x - V_y| \quad (1b)$$

where $\Sigma$ is the summation of a complete cycle.

The mass flow M can be determined from the formula:

$$M = K_a A \quad (2)$$

where $K_a$ is a constant and A or A' equals the area determined by equations (1a) or (1b) above. Constant $K_a$ can be found by calibration and, if a constant interval dt is used, mass flow can then be found according to the formulas:

$$M = K \int |V_x - V_y| dt \quad (3a)$$

or $$M = K \Sigma |V_x - V_y| \quad (3)$$

where K equals $K_a$dt and $\Sigma$ is the summation of a complete cycle.

Figure 3:
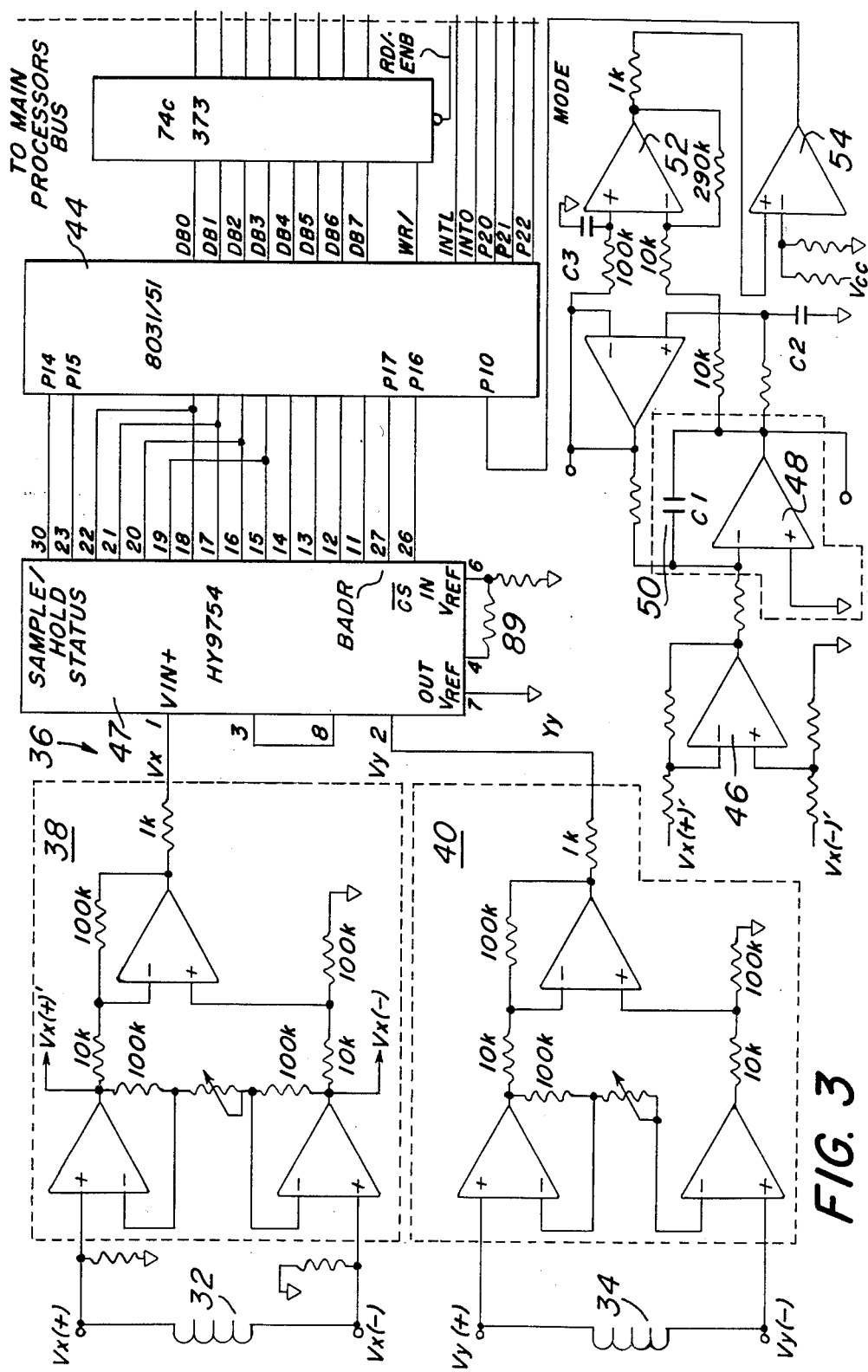
FIG. 3 shows one form of circuit for determining mass flow.

One form of circuit 36 for determining mass flow in accordance with the present invention is shown in FIG. 3. Velocity signals from velocity sensors 32 and 34, designated $V_x$ and $V_y$, may be taken from the output of their coils in any known manner. As shown in FIG. 3, it is preferred that the velocity signals $V_x$ and $V_y$ are taken across the terminals of the sensing coils of sensors 32 and 34, so that $V_x$ and $V_y$ are in the form of differential signals. As shown in the schematic of FIG. 3, $V_x(+)$ and $V_x(-)$ represent the voltages at opposite terminals of the coil, isolated from ground, or "floating." The same is true for $V_y(+)$ and $V_y(-)$. The signals across sensor coils for sensors 32 and 34 are then sent to conventional instrumentation amplifiers 38 and 40, which generate single $V_x$ and $V_y$ signals, referenced to internal ground. Instrumentation amplifier 38 also generates $V_x(+)'$ and $V_x(-)'$ signals, used to generate a MODE signal which will be described in greater detail below.

Velocity signals $V_x$ and $V_y$ are then sent to an A/D converter 42, where they are subtracted and converted to digital form. Internally of A/D converter 42, velocity signal $V_x$ and velocity signal $V_y$ form the inputs to a differential amplifier. The output of the differential amplifier is an analog signal representative of the difference between $V_x$ and $V_y$, and hence the A/D output is a digital signal representative of the difference between $V_x$ and $V_y$. The A/D converter output is sent to a microprocessor 44, which computes the area of each interval between the curves for velocity signals $V_x$ and $V_y$ according to equations (1a) or(1b) set forth above. A suitable microprocessor 44 may be an 80 31 or 80 51. The area calculations are then sent to a main processor (not shown) for conversion into mass flow data in accordance with equations (1) through (3) above.

The $V_x(+)'$ and $V_x(-)'$ signals generated by instrumentation amplifier 38 are used to generate a MODE signal. The $V_x(+)'$ and $V_x(-)'$ signals are amplified in differential amplifier 46 and then integrated by amplifier 48 and capacitor 50. The output of the integrating amplifier 48 is thus a sinusoidal signal identical to $V_x$, but, since it has been integrated, shifted in phase by 90°. The integrated velocity signal is then sent to amplifier 52 where it is processed into a square wave and sent to microprocessor 44 via buffer amplifier 54.

The MODE signal is used by microprocessor 44 as a timing signal for determining whether $V_x$ exceeds $V_y$ during either half of the MODE signal cycle. The processing of the signals will be discussed further in connection with FIG. 5.

Figure 4:
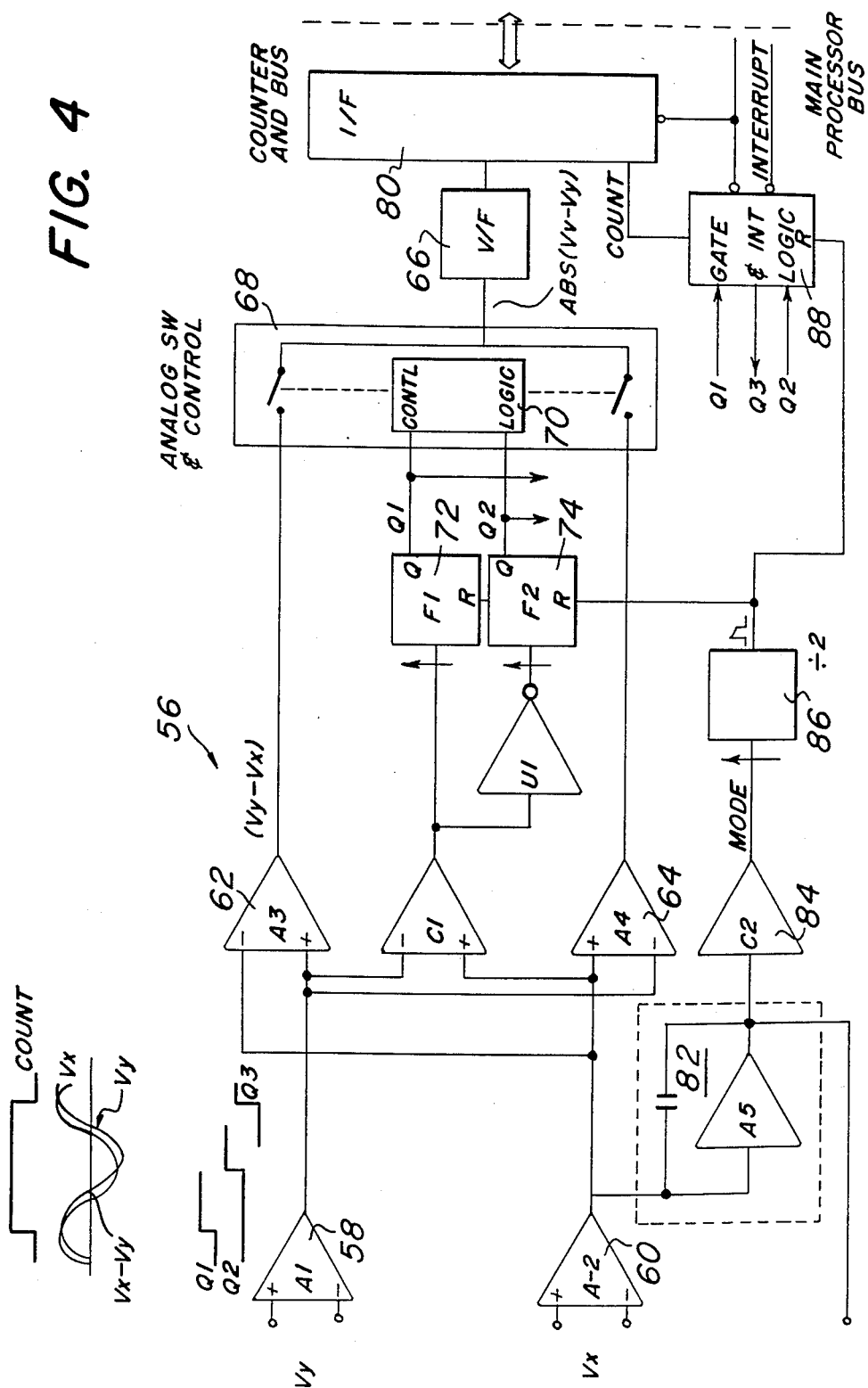
FIG. 4 shows an alternate form of circuit for determining mass flow in accordance with the present invention.

FIG. 4 illustrates a non-processor based embodiment of a circuit according to the present invention. The circuit is referred to generally by 56, and comprises instrumentation amplifiers 58 and 60 which are essentially identical to instrumentation amplifiers 38 and 40 shown in FIG. 3. The outputs of amplifiers 58 and 60 are sent to differential amplifiers 62 and 64. Differential amplifier 62 subtracts velocity signal $V_x$ from $V_y$, while differential amplifier 64 subtracts velocity signal $V_y$ from $V_x$. These subtracted signals are then sent to a voltage-to-frequency (V/F) converter 66 by means of analog switch 68, which is operated by control logic 70 in response to signals generated by flip flops 72, 74, inverter 76 and comparator 78. Comparator 78 provides clocking signals to flip flops 72 and 74 so that the control logic 70 operates analog switch 68 to connect the output of amplifier 62 to the V/F converter when the amplitude of velocity signal $V_y$ exceeds the amplitude of velocity signal $V_x$, and to connect the output of amplifier 64 to V/F converter 66 when the amplitude of velocity signal $V_x$ exceeds the amplitude of velocity $V_y$. In that manner, the input to V/F converter 66 will always be the absolute value of $V_x - V_y$.

The output of V/F converter is a square wave whose frequency varies with the input voltage. Thus, the frequency of the output of V/F converter is representative of the absolute value of the difference between velocity signal $V_x$ and $V_y$. Expressed differently, the number of output pulses from V/F converter 66 in a given interval is representative of the absolute value of the difference between $V_x$ and $V_y$ in the interval. The pulses generated by V/F converter are accumulated in a counter 80, where they are available for processing by a main processor (not shown), as in the embodiment of FIG. 3.

As in FIG. 3, a MODE signal is generated by integrater 82 and comparator 84. The MODE signal from comparator 84 is divided by two in divide-by-two circuit 86 and then sent to gating and logic circuit 88, where it is used as a timing signal for counter 80.

In FIG. 4, the significant signal is the difference between $V_x$ and $V_y$. The absolute value of that difference must be totalized. One way of viewing this is to consider that the portion of the cycle where $V_x$ exceeds $V_y$ corresponds to absorption of work input by the sensor tubes, whereas the portion where $V_x$ is less than $V_y$ represents recovery of work from the tubing. The two should net out to zero.

However, to gain maximum resolution, the absolute difference of each half cycle is totalized. Actually, work is absorbed and recovered during each half cycle and the compliment happens during the next half cycle, but the effect is the same. Thus, although the total work will be zero in algebraic terms, its absolute value has meaning as total energy.

In FIG. 4, the time for a complete cycle is represented by the signal COUNT. This is derived by dividing the MODE signal by two. In this representation, only every other cycle is totalized. The counter circuit could contain a set of data latches to take the data from the counter at the fall of the COUNT signal. This could be followed immediately (compared to the length of time required for an entire cycle) by a reset to the counters and a re-enable of counting. Thus, data could be accumulated every cycle.

Figure 5:
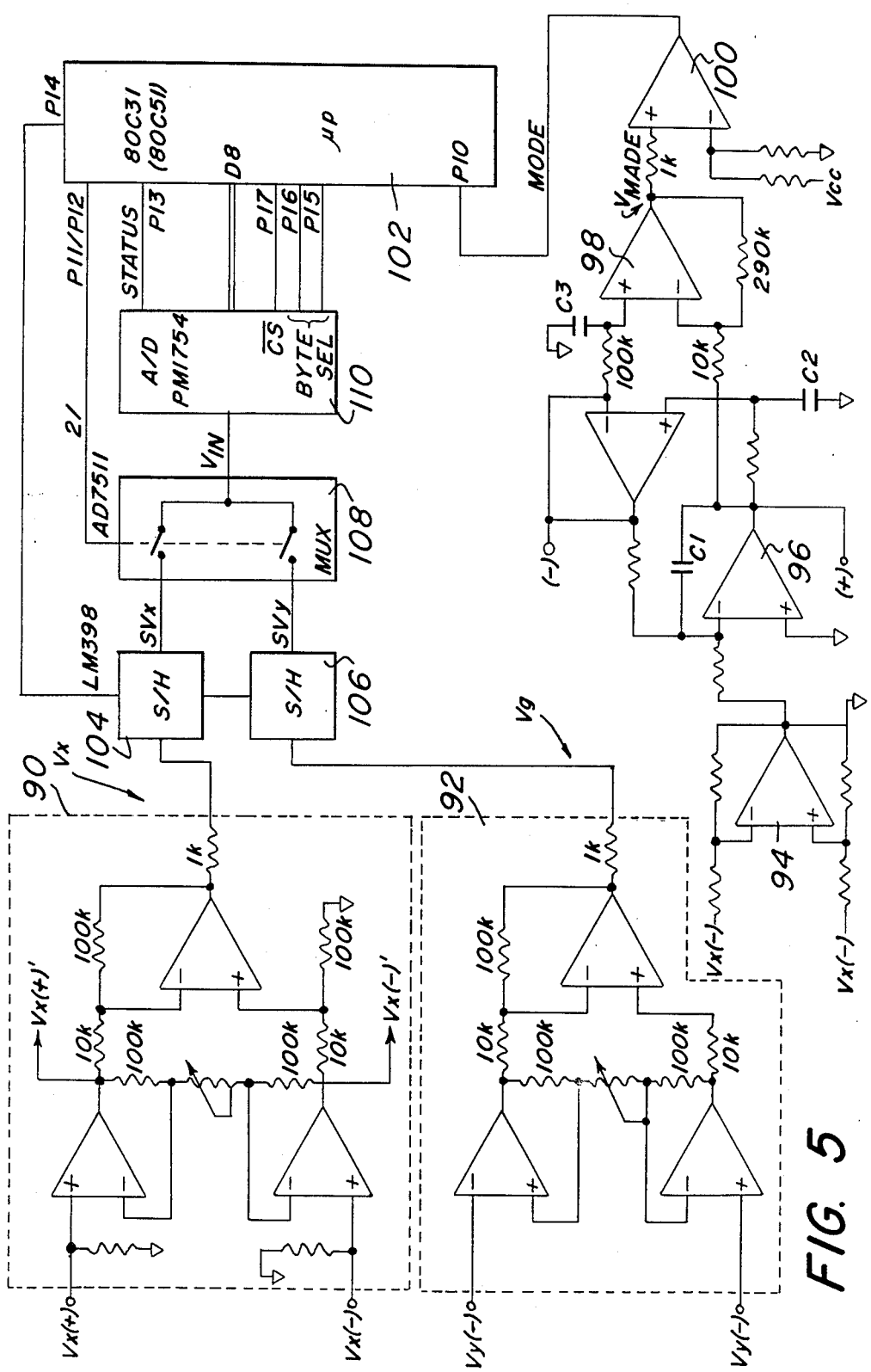
FIG. 5 shows another alternate form of circuit for determining mass flow in accordance with the present invention.

A third, and preferred, embodiment of a circuit according to the present invention is shown in FIG. 5. Velocity signals $V_x$ and $V_y$ are generated by instrumentation amplifiers 90 and 92 which, as can be seen, are identical to instrumentation amplifiers 38 and 40 already discussed in connection with FIG. 3. Also, as discussed in connection with FIG. 3, the MODE signal is generated in differential amplifier 94, integrating amplifier 96, amplifier 98 and buffer amplifier 100. The MODE signal is used to provide a timing signal to microprocessor 102, which is essentially the same as microprocessor 44 shown in FIG. 3.

Velocity signals $V_x$ and $V_y$ are sampled in sample and hold circuits 104 and 106, respectively. Both $V_x$ and $V_y$ are sampled at the same instant of time. The sampled values of $V_x$ and $V_y$ are then combined in analog multiplexer 108, and the combined signal, designated by $V_{in}$, is then sent to microprocessor 102 after being converted to digital form by A/D converter 110.

The absolute value of the difference between $V_x$ and from the sample values of $V_x$ and $V_y$, and is done in microprocessor 102. Microprocessor 102 may also be suitably programmed to obtain the sum of the samples of the area under each velocity curve $V_x$ and $V_y$ to determine whether the areas are equal, as ideally they should be. If the areas are not exactly equal, the microprocessor can calculate an amplitude correction factor to apply to either $V_x$ or $V_y$ to derive an amplitude-corrected signal, so that any difference between the amplitudes of $V_x$ and $V_y$ at a given point are due solely to the phase shift between $V_x$ and $V_y$, and not to amplitude differences.

Signal processing for the circuits shown in both FIG. 3 and FIG. 5 is essentially the same, except that in FIG. 3 the subtraction between $V_x$ and $V_y$ is performed electronically in A/D converter 42 whereas in the circuit of FIG. 5 the subtraction is performed in microprocessor 102.

Figure 6:
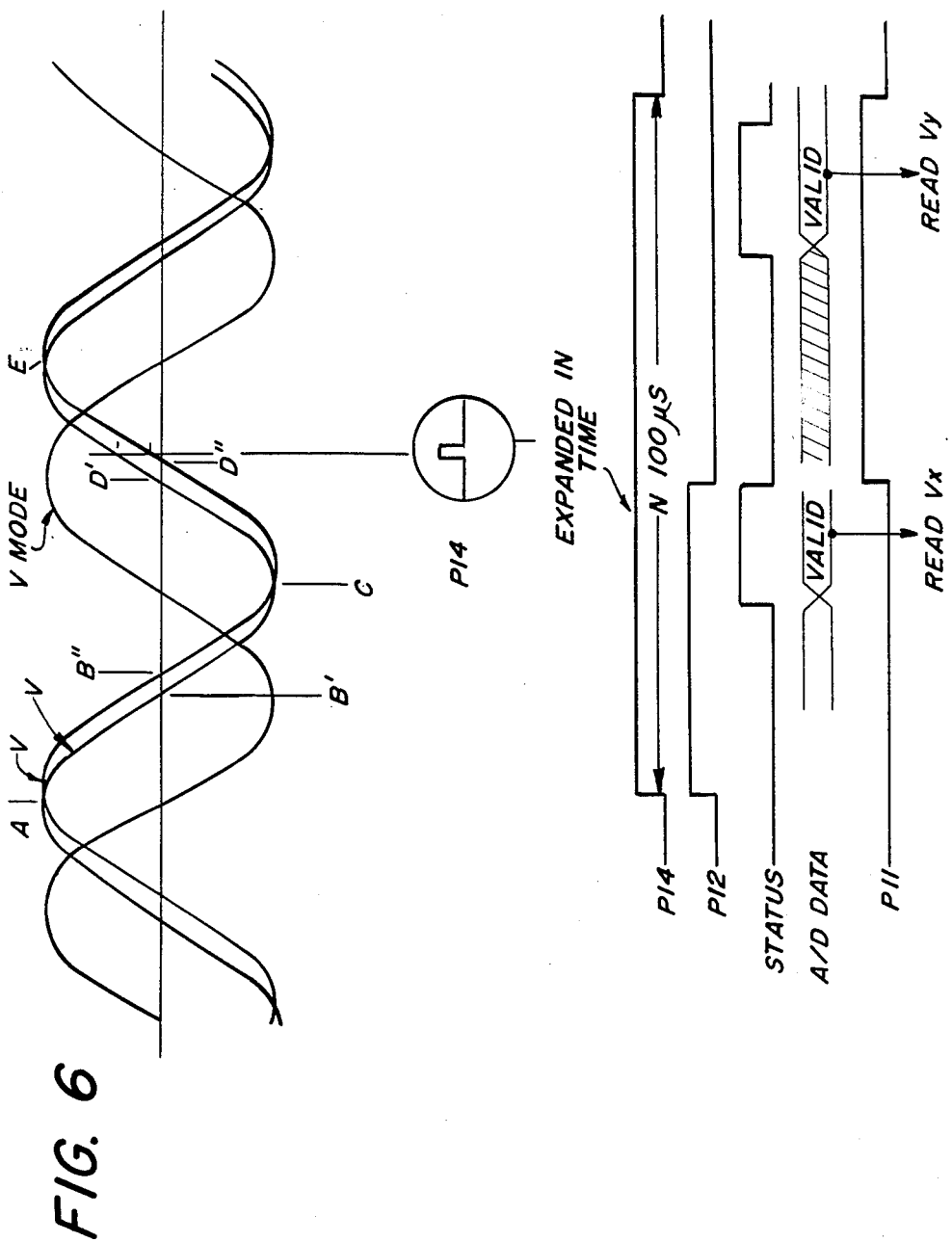
FIG. 6 illustrates a typical sample process for the sample and hold conversion.

The fall of the MODE signal below 0 volts starts the signal acquisition process. FIG. 2 depicts $V_x$ and $V_y$ as applied to the sample and hold circuits. FIG. 6 shows a typical sample process which will be repeated at each vertical bar shown in FIG. 2, as many times as samples are taken. The events for the acquisition process are the following:

(a) Microprocessor 102 raises the voltage at pin p14, which causes the sample and hold circuits 104 and 106 to stop tracking $V_x$ and $V_y$ and freeze their values at the inputs of multiplexer 108.

(b) The processor 102 addresses $V_x$ through the switch 108 by raising P12 and lowering P11.

(c) After a delay sufficiently long for an A/D conversion to take place, the STATUS line is polled to determine the actual time that the conversion is ready.

(d) The converted $V_x$ is read into $V_x$ memory in processor 102 indexed by a memory pointer into the $V_{mode}=0$ or $V_{mode}=1$ section of memory, as appropriate.

(e) P12 and P11 are reversed, selecting $V_y$ through analog switch 108.

(f) Step (c) is then repeated (g) The converted $V_y$ is read into $V_y$ memory, similar to step (d).

(h) P14 is now set to allow sample and hold circuits 104 and 106 to track $V_x$ and $V_y$, and the memory pointer is indexed.

(i) The MODE signal is monitored for a change of state in order to switch sections of the input data array and to terminate a complete cycle.

Thus, the data collection phase is completed for one cycle. Additional cycles are used for new measurements, or to increase the resolution of a single measurement, as required by the signal processing phase.

Good performance can be achieved by using a 14 bit A/D converter where only two to four samples per half cycle are taken. Slower speed and higher resolution may save hardware cost. Two A/D converters may be used, saving the analog switch 108 and associated potential errors with "droop" in the sample/hold outputs.

This configuration enables simultaneous sampling of each waveform.

The present invention may be embodied in other specific forms without departing from the spirit or essential attributes thereof and, accordingly, reference should be made to the appended claims, rather than to the foregoing specification, as indicating the scope of the invention.

I claim:

1. Method for determining the mass flow of a fluid flowing within a conduit, periodically oscillated transverse to the flow therein, comprising the steps of:
   (a) receiving periodic signals representative of the movement of the conduit at discrete spaced locations on the conduit,
   (b) determining the instantaneous amplitude difference between the signals at a plurality of discrete adjacent intervals,
   (c) determining the product of the absolute value of the instantaneous amplitude difference and the width of the interval for each said interval,
   (d) determining the sum of said products for each interval over a cycle of oscillation, and
   (e) generating from the sum a signal representative of mass flow.

2. Method according to claim 1, wherein the intervals are equal.

3. Method according to claim 1, further comprising the step of calculating an amplitude connection factor to apply to either of the received signals for causing any difference between the amplitudes of the signals at any given point to be due solely to the phase shift between the signals.

4. Method for determining the mass flow of a fluid flowing within a conduit, oscillated periodically transverse to the flow therein, comprising the steps of:
   (a) receiving periodic signals representative of the movement of the conduit at discrete spaced locations on the conduit,
   (b) dividing the period of said signals into a plurality of discrete, adjacent equal intervals,
   (c) determining the absolute value of the instantaneous amplitude difference between the signals for each interval,
   (d) summing the absolute values of the instantaneous amplitude differences for each interval over said period,
   (e) multiplying the sum by the width of the intervals, and
   (f) generating from the product a signal representative of mass flow.

5. Method according to claim 4, further comprising the step of calculating an amplitude correction factor to apply to either of the received signals for causing any difference between the amplitudes of the signals at any given point to be due solely to the phase shift between the signals.

6. Method for determining the mass flow of a fluid flowing within a conduit, oscillated periodically transverse to the flow therein, and having sensors for sensing the movement of the conduit at discrete spaced locations on the conduit, comprising the steps of: (a) receiving periodic signals representative of the movement of the conduit at said locations; (b) determining the integral of the absolute value of the difference between the amplitudes of the signals for a differential time interval (dt) over a cycle of oscillation; and (c) generating from the integral a signal representative of mass flow.

7. Method according to claim 6, further comprising the step of calculating an amplitudes correction factor to apply to either of the received signals for causing any difference between the amplitudes of the signals at any given point to be due solely to the phase shift between the signals.

8. Apparatus for determining the mass flow of a fluid flowing within a conduit having means for imparting a periodic transverse oscillation to the conduit and sensor means for sensing the movement of the conduit at discrete, spaced locations on the conduit and generating periodic signals representative of the movement of the conduit at said locations, comprising:
   (a) means for determining the instantaneous amplitude difference between the signals at a plurality of discrete, adjacent intervals,
   (b) means for determining for each said interval the product of the absolute value of the instantaneous amplitude difference and the amplitude of the interval,
   (c) means for determining the sum of the products for each interval over a cycle of oscillation, and
   (d) means for generating from the sum a signal representative of mass flow.

9. Apparatus according to claim 8, wherein the means for determining the instantaneous amplitude difference comprises a microprocessor.

10. Apparatus according to claim 8, wherein the means for determining the instantaneous amplitude difference comprises a differential amplifier.

11. Apparatus according to claim 8, wherein the means for determining the product of the absolute value of the instantaneous amplitude difference and the amplitude of the interval for each said interval, the means for determining the sum of the products for each interval over a cycle of oscillation, and the means for generating from the sum a signal representative of mass flow comprise a microprocessor.

12. Apparatus according to claim 8, further comprising means for generating a timing signal for initiating comparison between the periodic signals for determining which signal is of higher amplitude for each said interval.

13. Apparatus according to claim 8, further comprising means for calculating an amplitude correction factor from one signal to be applied to another signal to produce an amplitude corrected signal such that any difference between the amplitudes of the signals at a given point is due solely to the phase shift between the signals.

14. Apparatus for determining the mass flow of a fluid flowing within a conduit having means for oscillating the conduit transverse to the flow therein, and means for sensing the movement of the conduit at discrete, spaced locations on the conduit, and generating signals representative of the movement of the conduit at said locations, comprising:
   (a) means for dividing the period of said signals into a plurality of discrete, adjacent equal intervals,
   (b) means for determining the absolute value of the instantaneous amplitude difference between the signals for each interval,
   (c) means for summing the absolute values of the instantaneous amplitude differences for each interval over said period,
   (d) means for multiplying the sum by the amplitude of the intervals, and (e) means for generating from the product a signal representative of mass flow.

15. Apparatus according to claim 14, wherein the means for determining the instantaneous amplitude difference comprises a microprocessor.

16. Apparatus according to claim 14, wherein the means for determining the instantaneous amplitude difference comprises a differential amplifier.

17. Apparatus according to claim 14, further comprising means for generating a timing signal for initiating comparison between the periodic signals for determining which signal is of higher amplitude for each said interval.

18. Apparatus according to claim 14, further comprising means for calculating an amplitude correction factor to apply to either of the received signals for causing any difference between the amplitudes of the signals at any given point to be due solely to the phase shift between the signals.

19. Apparatus according to claim 14, wherein the means for summing the absolute values of the instantaneous amplitude differences for each interval over said period, the means for multiplying the sum by the amplitude of the intervals, and the means for generating from the product a signal representative of mass flow comprise a microprocessor.

20. Apparatus for determining the mass flow of a fluid flowing within a conduit, having means for periodically oscillating the conduit transverse to the flow therein and sensor means for sensing the movement of the conduit at discrete space locations on the conduit, and generating periodic signals representative of the movement of the conduit at said location, comprising (a) means for determining the integral of the absolute valve of the difference between the amplitudes of the signals for a differential time interval (dt) over a cycle of oscillating, and (b) means for generating from the integral a signal representative of the mass flow.

21. Apparatus according to claim 20, wherein both means comprise a microprocessor.

* * * * *